United States Patent [19]

Chan

[11] 4,425,017

[45] Jan. 10, 1984

[54] ELECTRICAL CONNECTOR INCLUDING HYDROPHOBIC GEL COMPOSITION

[75] Inventor: Howard K. C. Chan, Harlow, England

[73] Assignee: International Standard Electric Corporation, New York, N.Y.

[21] Appl. No.: 265,000

[22] Filed: May 19, 1981

[30] Foreign Application Priority Data

May 20, 1980 [GB] United Kingdom ............... 8016577

[51] Int. Cl.³ .................. H01R 4/70; H01B 3/22; H01B 3/44
[52] U.S. Cl. ..................................... 339/96; 252/314; 252/315.4; 252/572
[58] Field of Search .............. 252/316, 315.4, 572; 339/96

[56] References Cited

U.S. PATENT DOCUMENTS

| 2,491,641 | 12/1949 | Bondi | 252/316 X |
| 3,036,899 | 5/1962 | Schnider | 252/316 X |
| 3,972,581 | 8/1976 | Oldham | 339/96 |

FOREIGN PATENT DOCUMENTS 1379525  1/1975  United Kingdom ............... 339/96

Primary Examiner—Richard D. Lovering
Attorney, Agent, or Firm—James B. Raden; Harold J. Holt

[57] ABSTRACT

A hydrophobic gel composition comprises an aluminium stearate, liquid paraffin and polyisobutylene. The gels are prepared by first blending together aluminium stearate and liquid paraffin. The mix is then heated to 180°–200° C. and a quantity of polybutylene preheated to 150° C. is added, after which the composition is allowed to cool slowly to ambient temperature. The compositions are particularly useful in electrical connectors.

4 Claims, 2 Drawing Figures

ELECTRICAL CONNECTOR INCLUDING HYDROPHOBIC GEL COMPOSITION

This invention relates to hydrophobic insulating gel compositions, and in particular to such gel compositions for waterproofing underwater electrical devices and equipment.

A major problem with the design and use of underwater or partially submerged electrical equipment, for example electrical connectors, is that of preventing the ingress of water into the electrically 'live' portions of the equipment. In the case of a connector assembly which is to be mated and/or disconnected under water this problem is particularly acute.

According to one aspect of the invention there is provided a hydrophobic insulating gel composition comprising gel forming proportions of an aluminium stearate, liquid paraffin and polyisobutylene.

According to another aspect of the invention there is provided a method of making an insulating gel composition, including blending together an aluminium stearate and liquid paraffin, heating the blended mixture to a temperature of 180° to about 200° C., adding to the mixture a quality of polyisobutylene preheated to a temperature of 100°-150° C., and allowing the composition to cool to ambient temperature.

According to a further aspect of the invention there is provided an electrical connector having a first connection element located in a chamber closed by a diaphragm which is permeable by a further connection element to mate in the chamber with a first connection element, the chamber containing an electrically insulating hydrophobic gel composition comprising gel forming proportions of an aluminium stearate liquid paraffin and polyisobutylene.

We have found that gel compositions based on aluminium stearate, a hydrocarbon liquid and polyisobutylene are particularly effective as water blocking media in underwater and partially submerged electrical connectors, cables and the like.

The hydrophobic insulating gel compositions are prepared by first mixing measured quantities of aluminium stearate and a hydrocarbon liquid, typically liquid paraffin, until a uniform dispersion is obtained. The dispersion is then heated to form the gel and a measured quantity of polyisobutylene is mixed in to modify the gel fluid properties. The gel is maintained at an elevated temperature for a sufficient period of time to allow the escape of entrapped air bubbles and is allowed to cool to ambient temperature. The composition is then ready for use as a hydrophobic material.

BRIEF DESCRIPTION OF THE DRAWINGS

An embodiment of the invention will now be described with reference to the accompanying drawing in which:

Referring to FIG. 1, the preferred gel compositions are those indicated by the shaded region of the phase diagram. The gel compositions are not of course limited to this range, but outside the shaded area the gels may be subject to brittleness and/or phase separation.

A typical gel preparation process includes the initial step of blending into a weighed quantity of aluminium stearate, a weighed quantity of liquid paraffin. Suitable forms of aluminium stearate are the distearates supplied as "aluminium stearate G" and "aluminium stearate G2" by Durham Raw Materials Ltd. The liquid paraffin is added slowly to the aluminium stearate with continuous stirring so that the mixture changes from a dough to a fluid dispersion free from agglomerates. The mix is then heated with constant stirring to a temperature of 180°-200° C.

A measured quantity of polyisobutylene for example the material sold under the trademark Hyvis 30, is preheated to a temperature of 100°-150° C. and is then stirred into the aluminium stearate/liquid paraffin mixture until a uniform composition is obtained. This composition is maintained at 180°-200° C. for a sufficient period of time, typically 2 hours, to allow any entrained air bubbles to escape and is then allowed to cool uniformly to ambient temperature.

The gels thus formed are hydrophobic and may be used as water blocking material in various applications. They are particulary suitable for use in underwater electrical connectors where their flow properties ensure that the contacts remain hermetically sealed during mating and disconnection.

The following example illustrates the invention.

EXAMPLE 70 g of "aluminium stearate G" when placed in a 2.5 liter thermally lagged glass container. 1 liter liquid paraffin was added slowly stirring well between additions. The mixture consistency changed slowly with the addition of the paraffin from a dry powder to a dough and finally to a uniform fluid dispersion free from agglomerates. The mixture was then heated with constant stirring to a temperature of 190° C.

1 liter of polyisobutylene (Hyvis) was pre-heated to 150° C. and was then stirred into the hot stearate/paraffin mixture. The composition was maintained at 190° C. for two hours to allow the escape of air bubbles and was then allowed to cool in the lagged container to ambient temperature.

Figure 2:
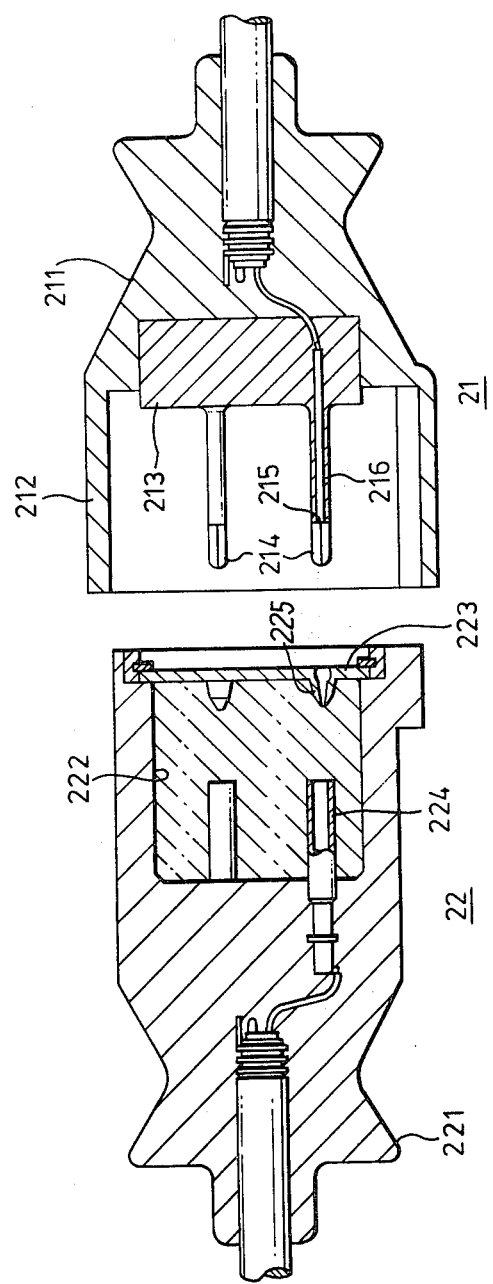
FIG. 2 is a schematic cross-section of a connector assembly designed for use with the gel composition.

Referring now to FIG. 2 of the drawing, there is shown a plug and socket connection assembly in which the gel compositions have found particular application. Other application include filling electrical cables to prevent moisture ingress. The gels can also be employed in any electrical apparatus to fill a gap or space therein thereby preventing the ingress of moisture into the gap or space from a wet, humid or underwater environment. The connector assembly of FIG. 2 comprises a male connector 21 and a female connector 22. The male connector 21 includes a plastic or rubber housing 211 having an integral sleeve 212 and contains a moulded insulating insert 213 supporting the connector pin contacts 214. Each male pin contact 214 is stopped near its free end to form a shoulder 215, the length of the contact between the shoulder 215 and the insert 213 being coated with insulating material 216.

The female connector 22 includes a plastic or rubber housing 221 containing a contact chamber 222 which chamber is sealed by an elastomeric, e.g. neoprene, diaphragm 223. The diaphragm is sealed to the housing 221 by conventional sealing means (not shown). The contact chamber is filled with the gel composition previously described herein. The housing 221 also supports female socket contacts 224 which extend into the gel filled chamber 222.

The diaphragm 223 is provided with inwardly directed pierced nipples 225 one in register with each socket contact 224. Preferably the nipples are substantially conical in cross-section with the diaphragm thickness tapering towards the apex where a cruciform cut is provided.

When the connectors 21 and 22 are mated the contact pins 214 are pushed through the diaphragm nipples until they are mated with the socket contact 224, the small volume of gel displaced in this operation being compensated for by a slight displacement of the diaphragm. When the connectors are later disassembled the gel flows into the space previously occupied by the pins 214 as the connectors are separated thus preventing the ingress of water and maintaining the electrical insulation of the female connector.

I claim:

1. An electrical connector having a first connection element located in a chamber closed by a diaphragm which is permeable by a further connection element to mate in the chamber with a first connection element, the chamber containing an electrically insulating hydrophobic gel composition consisting of gel forming proportions of an aluminium stearate, liquid paraffin and polyisobutylene.

Figure 1:
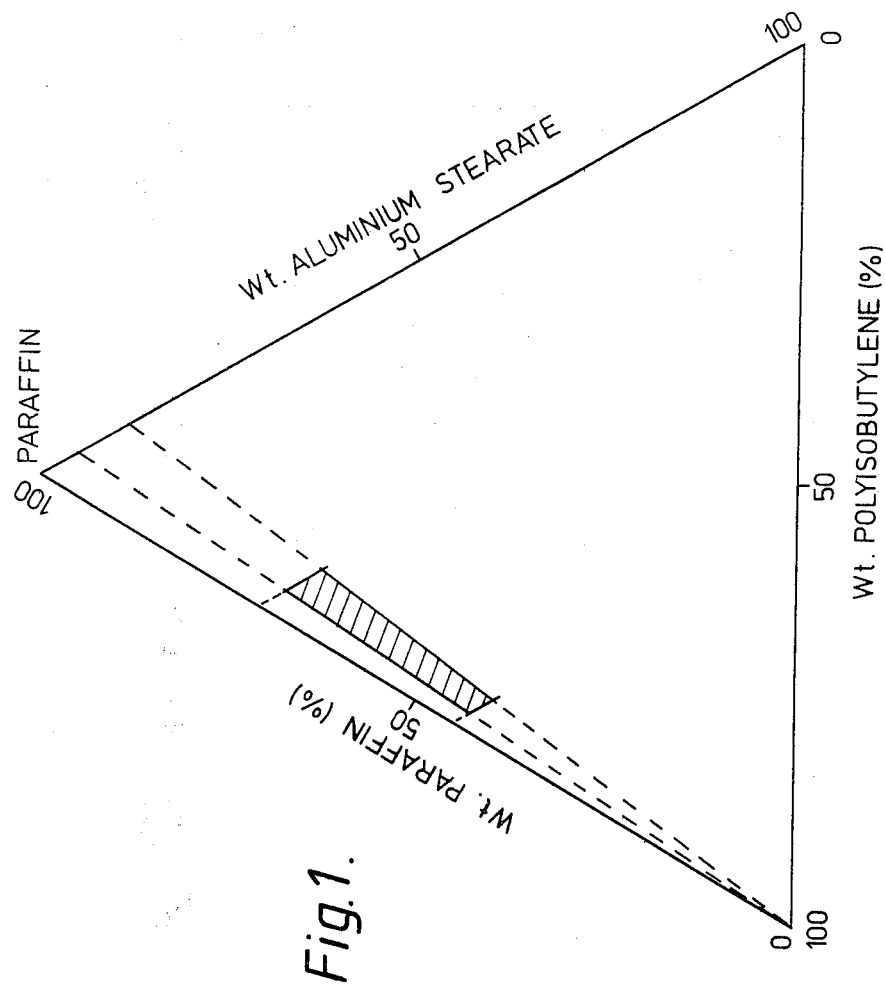
FIG. 1 is a phase diagram representing the aluminium stearate/liquid paraffin/polyisobutylene ternary system.

2. The connector of claim 1 wherein the gel composition consists of aluminium distearate, liquid paraffin and polyisobutylene, and wherein the gel composition lies within the shaded region of the phase composition diagram of FIG. 1 of the accompanying drawing.

3. The connector of claim 2 wherein the gel composition consists of 70 grams of aluminium distearate, 1 liter of liquid paraffin and 1 liter of polyisobutylene.

4. An electrical connector having first and second connector members each having one or more contacts and wherein one said connector member has a gel chamber disposed such that mating of the connector contacts is effected within the chamber, the chamber being filled, when the connector is in use, with a hydrophobic gel composition consisting of gel forming proportions of an aluminium stearate, liquid paraffin and polyisobutylene.

* * * * *